United States Patent [19]
Wibrow

[11] 4,093,389
[45] June 6, 1978

[54] CONNECTION AND FASTENING ELEMENT FOR CONNECTING WORKPIECES OF SOFT MATERIAL, ESPECIALLY DOWELS FOR PRESSBOARDS OR PARTS OF WOOD

[75] Inventor: Günter Wibrow, Norderstedt, Germany

[73] Assignee: ITW-Ateco G.m.b.H., Norderstedt, Germany

[21] Appl. No.: 731,597

[22] Filed: Oct. 12, 1976

[30] Foreign Application Priority Data

Oct. 14, 1975 Germany .............................. 2545859

[51] Int. Cl.² ............................................. F16B 7/00
[52] U.S. Cl. ..................................... 403/280; 403/297
[58] Field of Search ............... 403/297, 292, 282, 280, 403/281; 85/71, 85, 14, 31

[56] References Cited

U.S. PATENT DOCUMENTS

| 1,394,925 | 10/1921 | Marshall | 85/71 |
| 1,724,610 | 8/1929 | McArthur | 403/280 |
| 1,832,706 | 11/1931 | Hosher | 403/280 |
| 2,236,926 | 4/1941 | Surface | 403/280 |
| 2,277,956 | 3/1942 | Coffman | 403/280 |
| 3,438,659 | 4/1969 | Waldron | 403/280 |

FOREIGN PATENT DOCUMENTS

| 18,033 | 5/1928 | Netherlands | 85/71 |
| 1,106,798 | 3/1968 | United Kingdom | 85/85 |

Primary Examiner—Andrew V. Kundrat
Attorney, Agent, or Firm—Jack R. Halvorsen; Robert W. Beart

[57] ABSTRACT

The invention relates to a connection and fastening element for connecting workpieces of soft material, especially for pressboards or parts of wood, which is introduced into a pre-shaped blind bore of a workpiece and fastened therein.

7 Claims, 7 Drawing Figures

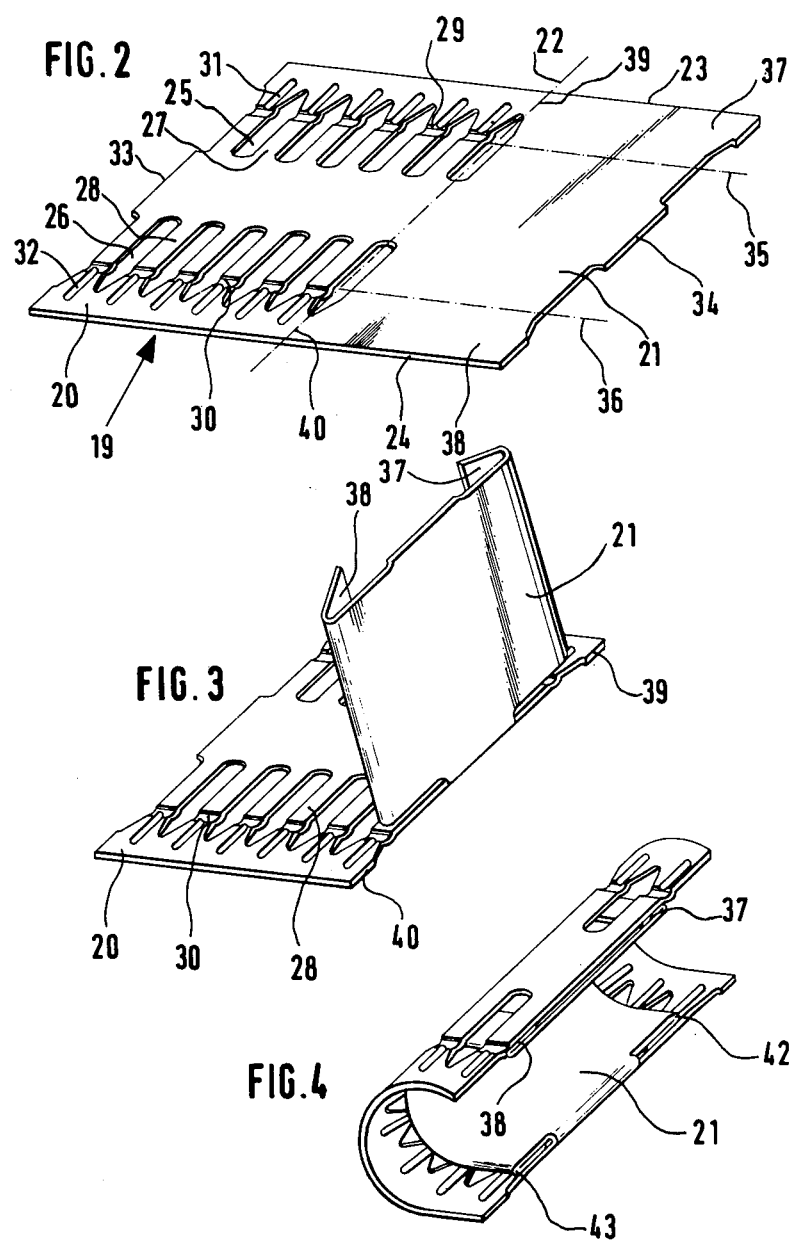

CONNECTION AND FASTENING ELEMENT FOR CONNECTING WORKPIECES OF SOFT MATERIAL, ESPECIALLY DOWELS FOR PRESSBOARDS OR PARTS OF WOOD

In the wood processing industry dowels are employed in a considerable extent for the connection of individual workpieces of wood with each other; for example, when manufacturing cupboards, boxes, bins or similar articles a mutual fastening is effected through dowels inserted into pre-shaped bores and glued in said bores. The dowels serve to fix the individual elements of wood with respect to each other and, after the glue has hardened, transfer the normally occurring forces.

Various embodiments of dowels of natural wood are used for the above purpose but also dowels of synthetic material. A beach dowel probably is employed in most cases, said dowel having a profiling of elongated grooves. In industrial production the thus profiled dowel is normally shot into prebored end walls of wood boards or pressboards fully automatically by automats after having been provided with glue before. The wood glue may then subsequently rise along the dowel shank, so that the dowel is glued in the bore over its entire surface. As already mentioned, dowels are normally inserted into the end faces of the plates or boards, so that the latter my be stacked one upon the other without being obstructed by the dowels. The boards may then be taken from the semifinished store as required and assembled together with the side walls which have been bored according to patterns, in a press to form an article of furniture.

When composing the article of furniture it is necessary that the bores into which the one-sidedly glued wooden dowel is pressed be provided with wood glue either manually or by machines so that the dowels and the boards may become glued from both sides. When dosing the glue, however, some difficulties will occur. In case of overdosing the superfluous glue will be squeezed out of the bore when the dowels is slipped in and must subsequently be removed from the side wall in an after-treatment which is connected with additional manufacturing expenses. In case of underdosing the tight fit of the dowel is rendered doubtful. For this reason, more dowels are mostly used for the sake of safety than would be needed for the required strength, the more so as a dowel connection cannot be checked, except it is destroyed.

In many cases dowels of synthetic material are employed too which, however, are likewise glued and therefore cause the same difficulties as mentioned above. In addition, with such dowels, a mold seam line displacement or an injection burr formation may very easily lead to trouble in automatic dowel supply in machine processing operations.

The invention is based upon the problem of providing a connection and fastening element, especially a dowel for pressboards or parts of wood, which has at least the same tight fit as conventional dowels but which may be inserted without any glue being applied.

With a connection and fastening element of the type mentioned at the beginning this problem is solved in that a hollow pin bent from sheet metal is pre-shaped in at least one end portion in such a manner that upon axial upsetting of said portion in a blind bore at least parts of said portions will become vaulted outwardly in a direction towards the bore wall.

The fastening element according to the invention may likewise be fully automatically shot into bores of a workpiece of wood or similar material as may the known dowels. The fastening element according to the invention thus does not necessitate any changes in the manner of processing and the automatic production lines. The important advantage of the fastening element according to the invention, however, lies in that gluing as well as the entire glue application is eliminated. The workpieces are assembled as usual, for instance, with the aid of conventional presses. In the process of compression the hollow pin will be shortened and vaulted outwardly in its pre-shaped end portion, so that the hollow pin will dig itself into the wall of the bore and take care of an extraordinarily good tight fit. If the fastening element according to the invention is respectively introduced into two bores, pre-shaped deformable portions are advantageously provided at both ends for anchoring in the wall of the bore.

The fastening element according to the invention leads to a reduction in production and mounting costs because both glue application and curing time of the glue are eliminated. For this reason, for example, it is no longer necessary in the furniture industry to nail the rear wall to the body in the press which, in conventional manufacture, is meant to bring about a holding effect between the side walls, the cover and the bottom until the glue hardens, because the fastening element according to the invention obtains its final strength immediately with the pressing operation.

With the fastening element according to the invention it is possible, besides, to obtain a shearing and tear-off strength which is considerably above the corresponding values of a hardwood dowel.

For this reason the number of bores in the workpieces may be kept as small as possible.

The sheet metal blank for the fastening element according to the invention may be formed in the manner as desired. In one embodiment of the invention provision is made for this purpose for the sheet metal blank to be of a rectangular configuration and preferably bent or rolled cylindrically with the abutting line disposed in parallel with the longitudinal axis in the cylinder surface. The fastening element according to the invention thus has the shape of a parted sheet metal sleeve.

The pre-shaped portion of the fastening element according to the invention which enters the bore is to be deformed radially outwardly by upsetting and is to anchor itself in the bore. For the formation of this end portion and to obtain the desired effect various configurations may be imagined. One embodiment of the invention provides for several parallel slots to be arranged at intervals from each other in the end portion, at a predetermined space from the end of the end portion, said slots forming between them webs adapted to be bent outwardly. The thus formed webs or legs will upon a corresponding axial upsetting of the fastening element be bent outwardly or kinked outwardly and in so doing will grip into the wall of the bore like claws.

So that the webs or legs will indeed bend outwardly and, if possible, will do so at a predetermined location, provision is made in a further embodiment of the invention for the webs to have radially outwardly pointing beads extending over the entire width thereof. The bead determines the bend of the webs, so that they will experience a deformation at the desired place in order to develop their full effect of tight retention.

The outward vaulting and deformation of the webs at the desired position is furthermore enhanced by the feature that they are provided with one or several radially outwardly pointing reinforcing beads extending longitudinally of the webs. The reinforcing beads preferably extend following the transversely extending bead in a direction towards the end of the pin. Owing to this feature the webs are deformed outwardly upon upsetting in such a manner that a sort of undercut results by which a particularly favourable effect of tight retention is obtained.

To counteract the danger of the end portion deforming inwardly instead of outwardly, one embodiment of the invention provides for an integral reinforcing member to be surrounded by the hollow pin and extending a certain length into the pre-shaped end portion. The reinforcing member thus ensures that the end portion is always deformed radially outwardly.

In accordance with the invention the reinforcing insert is likewise formed of sheet metal in the shape of a sleeve and its raw material blank is formed integrally with that of the hollow pin. The flat blank of the reinforcing member is bent over prior to forming the hollow pin in such a manner that is comes to overlie on an area of the flat blank for the hollow pin and is rolled up together with it.

In another embodiment of the invention provision is made for the flat blank of the reinforcing member to be of the same axial length as the hollow pin and for an outer axial end portion to be bent inwardly back into the plane of the reinforcing member flat blank before the latter is bent into the plane of the flat blank for the hollow pin. With the aid of the rolled-up reinforcing sheet metal end portions or lobes an additional reinforcement of the fastening element of the invention is obtained. The fold between the sheet metal end portions or lobes and the remaining portion of the reinforcing member preferably extends above the desired locations of the bends at the webs, so that the webs are in any case deformed outwardly and not inwardly.

To facilitate the introduction of the fastening element according to the invention which is suitably formed of a hollow cylindrical pin, at least one end is formed with a slight conical tapering in the process of rolling up the hollow pin.

In the following one example of embodiment of the invention will be described in more detail by way of the drawings:

FIG. 2 shows a substantially flat sheet metal blank for a fastening element according to the invention;

FIG. 3 shows an intermediate stage during the formation of the blank according to FIG. 1;

FIG. 4 shows another interemdiate step during the formation of the blank according to FIG. 2;

Figure 1:
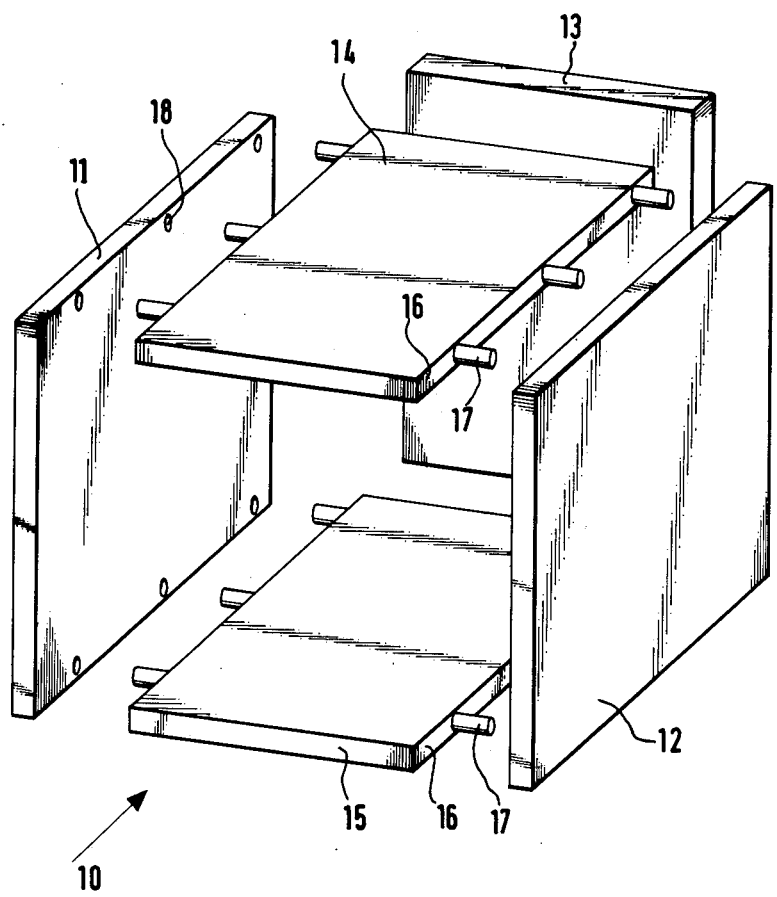
FIG. 1 shows a perspective view of wall portions of an article of furniture in connection with fastening elements according to the invention.

The furniture body 10 of pressboards which is shown in FIG. 1 in an exploded view is composed of two sidewall plates 11, 12, one rear wall plate 13, a cover plate 14, and a bottom plate 15. The cover and bottom plates 14, 15 are each provided with three dowels 17 on oppositely disposed end faces 16 which are inserted in blind bores. The blind bores 18 are provided in the side wall plates 11, 12 corresponding to the dimensions of and spaces between the dowels 17 (recognizable only at the side plate 11). The construction of thr dowels 17 may be seen in more detail from the following description.

FIG. 2 shows a cut blank 19 of relatively soft sheet metal. This blank is approximately rectangularly shaped and consists of two portions 20, 21 which are separated by the dash-dotted line 22 extending at right angles with respect to the two parallel sides 23, 24. Portion 20 is provided with two rows of parallel slots 25, 26 spaced from each other and extending at a certain distance from the two edges 23, 24 with the axes thereof extending normal to said edges. The slots 25, 26 are rounded off at the ends with the end facing the edges 23, 24 slightly tapering. The slots 25, 26 form between them webs 27, 28 which are provided in about the center thereof with transversely extending continuous beads 29, 30. Each web 27, 28 has in addition a longitudinally extending bead 31, 32 extending from the beads 29 and 30, respectively, in a direction towards the facing edges 23 and 24, respectively.

The other two edges 33, 34 of the cut 19 are both formed alike, namely, as if the portion 20 would be severed in some location along the longitudinal axis by a pair of slots 25, 26. The meaning of this shaping will become clear from the following specification. The dash-dotted lines 35, 36 in portion 21 in parallel with the edges 23 and 24 are bending lines for the end portions or lobes 37, 38 which are defined by the bending lines 35, 36 and the severing or bending line 22.

Figure 5:
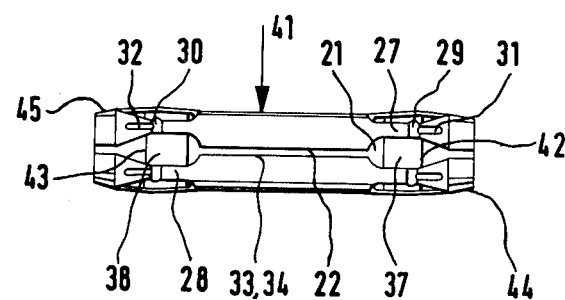
FIG. 5 shows a lateral view of a fastening element according to the invention.

For the formation of a dowel 17 in accordance with FIG. 1, the lobes 37, 38 are first folded about the bending lines 35 and 36, respectively, into the plane of the portion 21 (FIG. 3). For this purpose it is necessary that the portion 21 be separated from portion 20 in this region by the slots 39, 40. Subsequently, the portion 21 is bent into the plane of the portion 20, i.e. about the bending line 22 (FIG. 2). The thus obtained double-walled sheet metal portion is subsequently rolled up to form a cylindrical hollow pin; an intermediate step being shown in FIG. 4, while FIG. 5 shows the finished hollow pin or dowel 41. Portion 20 according to FIGS. 2 to 4 forms the outer surface, while portion 21 is an integral reinforcing member surrounded by the latter; the folds 42, 43 of portion 21 in this arrangement extend over the transversely extending beads 29, 30 of the webs 27, 28.

As may be seen from FIGS. 4 and 5, what results from the sheet metal blanks 19 according to FIG. 1 is a partially double-walled hollow cylindrical dowel 41 or hollow pin, with the edges 33, 34 (FIG. 1) on the one hand and the fold on the other hand along the bending line 22 abutting against each other along a line lying on the surface of the dowel 41 and extending in parallel with the longitudinal axis thereof. As will further be seen from FIG. 5, slots shaped in a similar manner as the slots 25, 26 according to FIG. 2 result again at the point of abutment.

Figure 6:
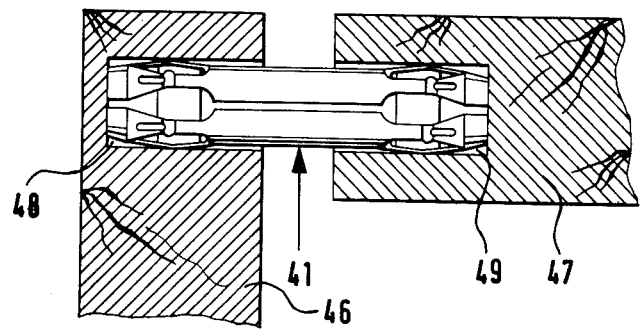
FIG. 6 shows the fastening element according to the invention as shown in FIG. 5 inserted in two oppositely disposed blind bores of two pieces.

During the rolling-up operation (see FIG. 4) the dowel 41 is formed with a slight conical tapering at the ends 44, 45 so that it may be inserted more easily in predetermined blind bores particularly in automatic production, as shown by way of FIG. 6.

Figure 7:
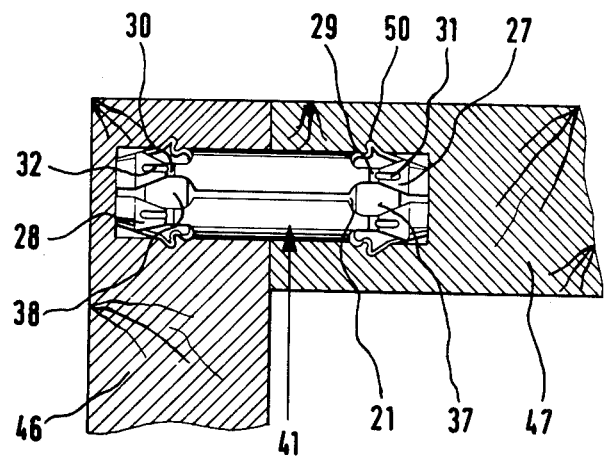
FIG. 7 shows the pressing-in of the fastening element according to FIG. 6 into the blind bores.

Two pressboards 46, 47 are provided with blind bores 48, 49, with one end of the dowel 41 respectively inserted in said bores. The two boards 46, 47 are approached to each other by means of a press (not shown) so that they abut against each other, as shown in FIG. 7. In this operation the end regions of the dowel 41 are upset. Thereby the webs 27, 28 become bent outwardly, i.e. in front of the transverse beads 29, 30, as shown in FIG. 7. The longitudinally extending beads 31, 32 are more resistant to bending effects in this portion of the web than the more inwardly disposed web portion, so that there will be no uniform vaulting of the webs 27, 28 but a non-uniform one such that vaults or bulgings will result in the form of undercuts or barbs as shown at 50, which grip the material of the boards 46, 47 like claws and resist pull-out forces. The insert 21 with the folded lobes 37, 38 prevents the webs 27, 28 from becoming vaulted radially inwardly.

I claim:

1. A one-piece sheet metal connection and fastening element adapted for connecting workpieces of relatively soft material having predetermined depth blind bores therein, said fastening element including a hollow pin bent from flat sheet metal stock having in at least one end thereof a plurality of circumferentially spaced axially extending elongated openings spaced from the ends of the pin, said elongated openings being provided in parallel spaced arrangement at a predetermined distance from the end of said at least one end portion and forming between said elongated openings a plurality of webs integrally connected at their opposite ends and adapted to be bent outwardly intermediate the extremities of said webs, a sheet metal, sleeve-like reinforcing member surrounded by and integral with the hollow pin, said member extending a predetermined distance into the end portions carrying said webs whereby said at least one end portion can be axially upset in the blind bore of said workpiece with at least partial portions of said webs being vaulted radially outwardly in a direction towards and into the wall of said bore.

2. Element according to claim 1, characterized in that the hollow pin tapers slightly conically (44, 45) towards at least one end.

3. Element according to claim 1, characterized in that the webs (27, 28) are each provided with a radially outwardly pointing bead (29, 30) extending over the entire width thereof.

4. Element according to claim 3, characterized in that the webs are provided with at least one radially outwardly pointing reinforcing beads which extend longitudinally of the webs.

5. Element according to claim 1, characterized in that the blank (21) of the reinforcing member is formed integrally with that of the hollow pin and prior to the forming of the hollow pin is bent in such a manner that is overlies an area of the blank (20) for the hollow pin.

6. Element according to claim 5, characterized in that the blank (21) for the reinforcing member is of the same length as that for the hollow pin and that the axially outer end portions (37, 38) are bent inwardly back into the plane of the reinforcing member blank (21) before the latter is bent into juxtaposition with the plane of the blank (20) for the hollow pin.

7. Element according to claim 5, characterized in that the reinforcing member (21, 37, 38) extends axially beyond the bead of said webs.

* * * * *